United States Patent
Ono

(10) Patent No.: US 10,511,739 B1
(45) Date of Patent: Dec. 17, 2019

(54) IMAGE PROCESSING APPARATUS AND IMAGE PROCESSING METHOD FOR GENERATING SCALED IMAGE DATA

(71) Applicant: TOSHIBA TEC KABUSHIKI KAISHA, Shinagawa-ku, Tokyo (JP)

(72) Inventor: Shinji Ono, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/155,977

(22) Filed: Oct. 10, 2018

(51) Int. Cl.
*H04N 1/393* (2006.01)
*H04N 1/047* (2006.01)
*H04N 1/053* (2006.01)
*H04N 1/00* (2006.01)

(52) U.S. Cl.
CPC ......... *H04N 1/393* (2013.01); *H04N 1/00469* (2013.01); *H04N 1/0473* (2013.01); *H04N 1/053* (2013.01)

(58) Field of Classification Search
CPC ... H04N 1/393; H04N 1/3877; H04N 1/00469
USPC .......................... 358/1.2, 3.27; 382/296, 298
See application file for complete search history.

(56) References Cited

U.S. PATENT DOCUMENTS

| 4,899,227 | A | 2/1990 | Yamada | |
| 2009/0103834 | A1* | 4/2009 | Jeffrey | G06T 3/4023 382/298 |
| 2011/0298982 | A1* | 12/2011 | Kobayashi | G06T 3/40 348/581 |
| 2015/0220255 | A1* | 8/2015 | Maeda | H04N 1/00411 715/764 |

* cited by examiner

*Primary Examiner* — Jamares Q Washington
(74) *Attorney, Agent, or Firm* — Amin, Turocy & Watson, LLP

(57) ABSTRACT

According to one embodiment, an image processing apparatus includes an input unit and a control unit. The input unit accepts a reference point of scaling for enlarging or reducing image data. The control unit performs inversion for inverting the image data according to the reference point in either or both of a main scanning direction and a sub scanning direction. The control unit performs scaling on the inverted image data generated by performing the inversion to generate scaled image data. The control unit performs inversion on the scaled image data again to generate non-inverted scaled image data.

20 Claims, 14 Drawing Sheets

IMAGE PROCESSING APPARATUS AND IMAGE PROCESSING METHOD FOR GENERATING SCALED IMAGE DATA

FIELD

Embodiments described herein relate generally to an image processing apparatus and an image processing method.

BACKGROUND

In a multifunction peripheral, there is a case where image data generated by scanning an original document is enlarged or reduced and then printed. In this case, enlargement or reduction is performed with a start point of scanning as a reference point. The start point of scanning indicates a position at which scanning of the original document is started.

Therefore, when setting an original document on a scanner, a user adjusts the direction of the original document to be set in consideration of the start point of scanning. Accordingly, an operation when the original document is set on the scanner is complicated.

DETAILED DESCRIPTION

In general, according to one embodiment, an image processing apparatus includes an input unit and a control unit. The input unit accepts a reference point of scaling for enlarging or reducing image data. The control unit performs inversion for inverting the image data according to the reference point in either or both of a main scanning direction and a sub scanning direction. The control unit performs scaling on the inverted image data generated by performing the inversion to generate scaled image data. The control unit performs inversion on the scaled image data again to generate non-inverted scaled image data.

Hereinafter, the image processing apparatus of the embodiment will be described with reference to the drawings.

Figure 1:
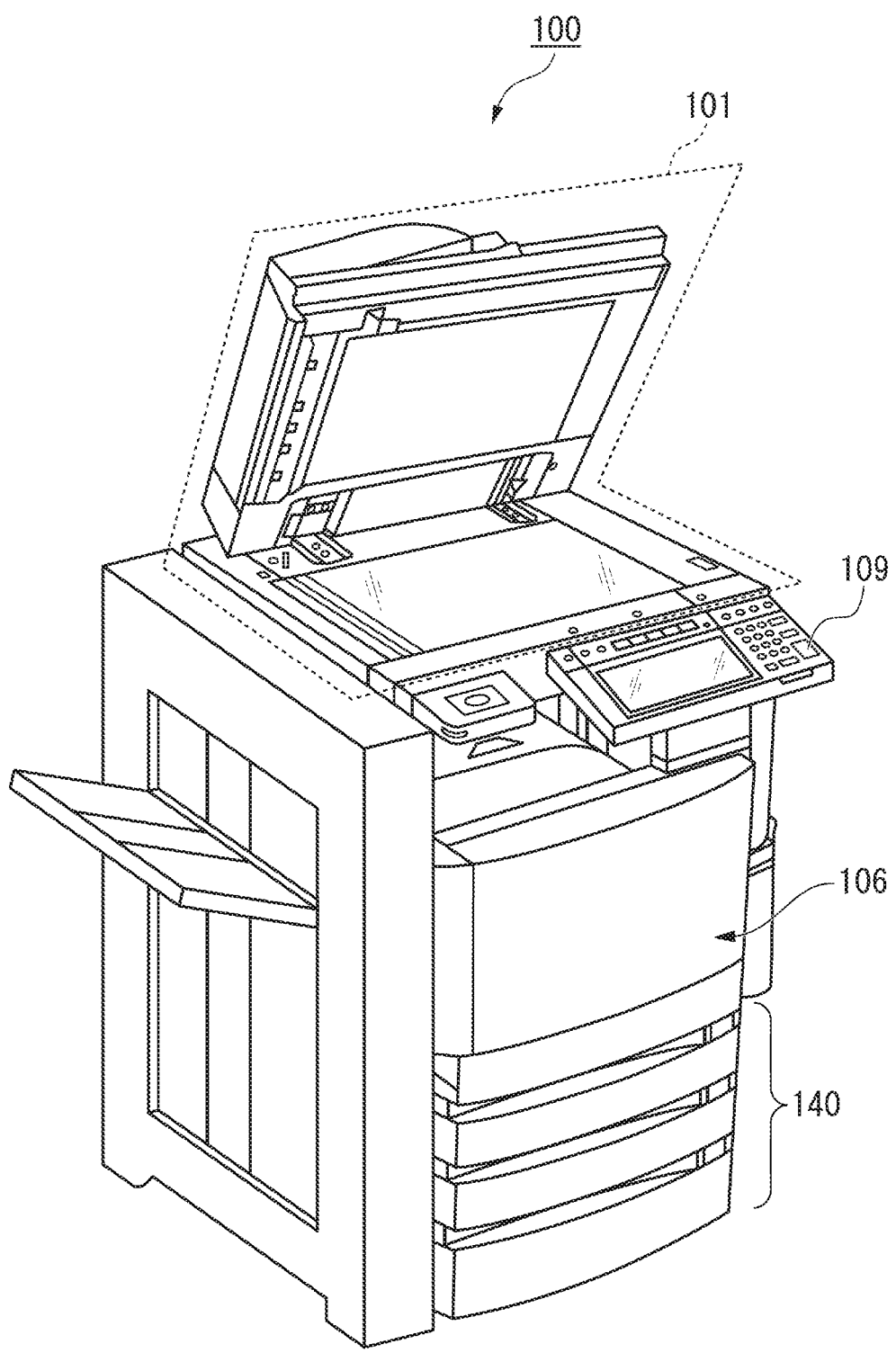
FIG. 1 is an exterior view illustrating an overall configuration example of an image processing apparatus according to an embodiment.

FIG. 1 is an exterior view illustrating an overall configuration example of an image processing apparatus 100 according to an embodiment. The image processing apparatus 100 is, for example, a multifunction peripheral. The image processing apparatus 100 includes a control panel 109, a printer unit 106, a sheet storing unit 140, and a scanner unit 101. The printer unit 106 of the image processing apparatus 100 may be an electrophotographic apparatus which fixes a toner image or may be an ink jet type apparatus.

The image processing apparatus 100 forms an image on a sheet using a developer such as toner. The sheet is, for example, paper or a label sheet. The sheet may be any substance as long as the image processing apparatus 100 can form an image on the surface thereof.

The control panel 109 includes a display. The display is an image display device such as a liquid crystal display or an organic electro luminescence (EL) display. The display displays various kinds of information on the image processing apparatus 100. In addition, the control panel 109 has a plurality of buttons and receives the operation of a user. The control panel 109 may be configured as a touch panel.

The printer unit 106 forms an image on a sheet based on image data generated by the scanner unit 101. The printer unit 106 forms an image on a sheet based on image data received via a network. The printer unit 106 forms an image by, for example, the following process.

The printer unit 106 forms an electrostatic latent image on a photoconductive drum based on image data. The printer unit 106 forms a visible image by applying a developer such as toner to the electrostatic latent image. Examples of toners include yellow, magenta, cyan, and black color toners.

The printer unit 106 transfers the visible image onto a sheet. The printer unit 106 heats and pressurizes the sheet to thereby fix the visible image on the sheet. Note that the sheet on which the image is formed by a fixing unit is discharged from a sheet discharge unit to the outside of the apparatus.

The sheet storing unit 140 stores sheets to be used for image formation in the printer unit 106. The sheet on which an image is formed may be a sheet stored in the sheet storing unit 140 or may be a manually fed sheet.

The scanner unit 101 reads an image to be read as contrast of light and converts the read image into image data such as an RGB value. The scanner unit 101 records the image data of the read image. The recorded image data may be transmitted to another information processing apparatus via a network. The recorded image data may be formed as an image on the sheet by the printer unit 106.

Figure 2:
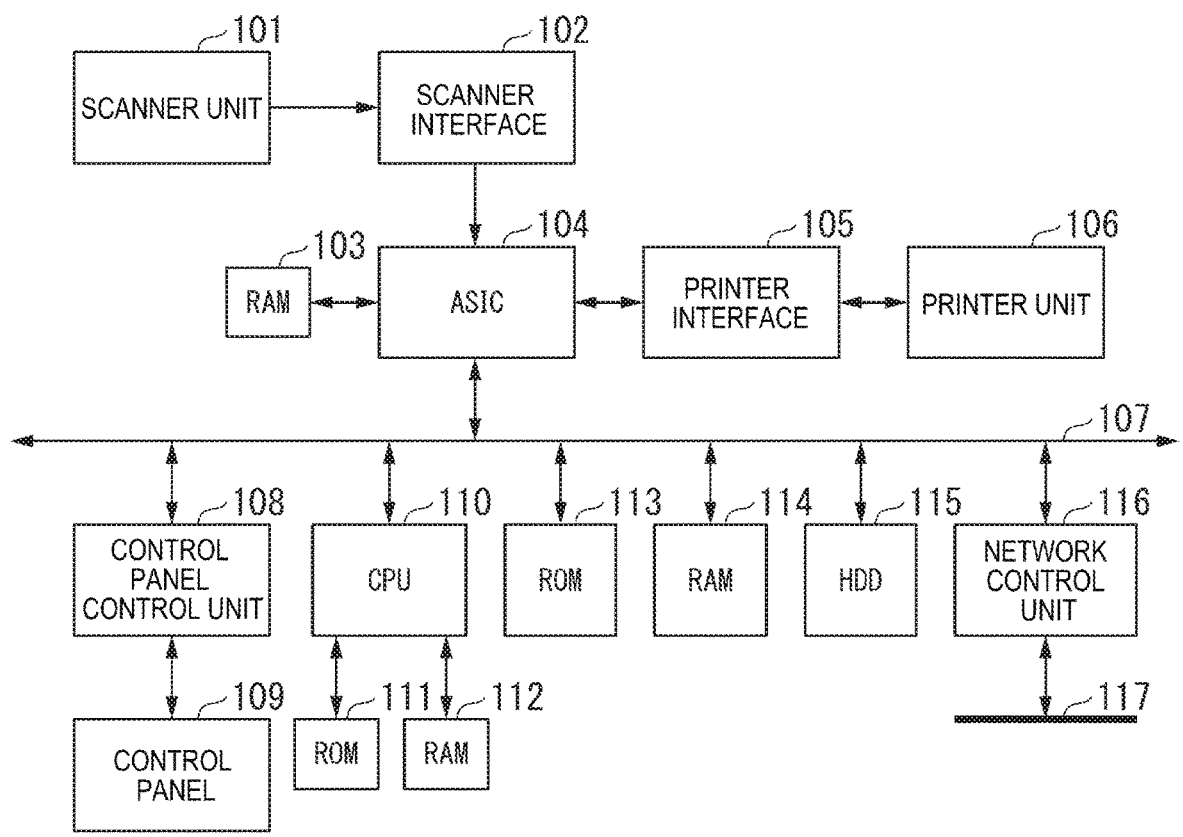
FIG. 2 is a diagram illustrating an example of a hardware configuration.

FIG. 2 is a diagram illustrating an example of a hardware configuration of the image processing apparatus 100 in the embodiment.

The image processing apparatus 100 includes the scanner unit 101, a scanner interface 102, and a random access memory (RAM) 103. The image processing apparatus 100 further includes an application specific integrated circuit (ASIC) 104, and a printer interface 105. The image processing apparatus 100 further includes the printer unit 106, a control panel control unit 108, and the control panel 109. The image processing apparatus 100 further includes a central processing unit (CPU) 110, a read only memory (ROM) 111, the RAM 112, and a ROM 113. The image processing apparatus 100 further includes a RAM 114, a hard disk drive (HDD) 115, and a network control unit 116. Each unit is connected to each other via a bus 107.

The scanner unit 101 scans an original document to generate image data. Although not illustrated in the drawing, the scanner unit 101 has a charge coupled device (CCD) sensor, a scanner lamp, a scanning optical system, a condenser lens, and the like.

The CCD sensor converts formed image light into an electric signal and generates image data. The scanner lamp illuminates an image to be read. In the scanning optical system, a mirror that changes an optical path of light reflected from an original document to be read is mounted. The condenser lens collects the light reflected from the original document to be read and forms an image.

The scanner unit 101 outputs the generated image data to the ASIC 104 via the scanner interface 102. The ASIC 104 performs image processing based on the image data input from the scanner interface 102. The image processing includes processes of inversion, enlargement, reduction, and filtering of image data and the like. The ASIC 104 in the embodiment performs enlargement or reduction based on the reference point specified by a user. The RAM 103 is a memory used when the ASIC 104 performs image processing.

The printer interface 105 outputs the image data output by the ASIC 104 to the printer unit 106 in response to a printing instruction. The printer unit 106 forms an image on the sheet based on the input image data.

The control panel control unit 108 controls the display of the control panel 109 and outputs the input information. The control panel 109 accepts an instruction to execute scanning and printing according to the operation of a user or the like. In addition, the control panel 109 accepts the input of the reference point and the magnification in enlargement or reduction of the image data.

The CPU 110 controls the entire image processing apparatus 100. For example, the ROM 111 stores a control program used by the CPU 110, and the like. For example, the RAM 112 stores data and the like used for control by the CPU 110.

The ROM 113 stores data and the like used by each unit for processing. The RAM 114 and the HDD 115 store image data after image processing. The RAM 114 and the HDD 115 store image data and the like received by the network control unit 116 via a network 117.

Figure 3:
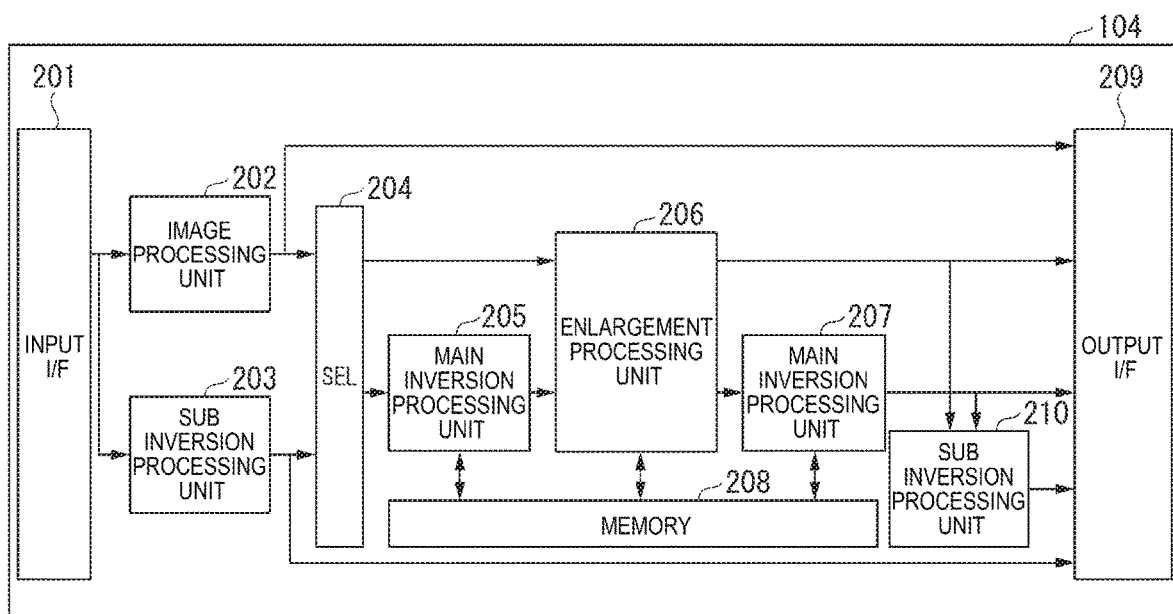
FIG. 3 is a diagram illustrating an example of a configuration of an ASIC illustrated in FIG. 2.

FIG. 3 is a diagram illustrating an example of a configuration of the ASIC 104 illustrated in FIG. 2. The ASIC 104 has an input interface 201, an image processing unit 202, a sub inversion processing unit 203, a SEL 204, and a main inversion processing unit 205. The ASIC 104 further has an enlargement processing unit 206, a main inversion processing unit 207, a sub inversion processing unit 210, a memory 208, and an output interface 209.

The input interface 201 outputs the input image data to the image processing unit 202 or the sub inversion processing unit 203 according to the control of the CPU 110. The image processing unit 202 performs image processing of the image data. The image processing includes filtering of image data and the like.

The sub inversion processing unit 203 performs inversion for inverting the input image data in the sub scanning direction. The sub inversion processing unit 203 outputs the image data after inversion to the SEL 204 or the output interface 209.

The SEL 204 receives the image data output from the image processing unit 202 or the sub inversion processing unit 203 as an input. The SEL 204 outputs the input image data to the main inversion processing unit 205 or the enlargement processing unit 206 according to the input information.

The main inversion processing unit 205 performs inversion for inverting the input image data in the main scanning direction. The main inversion processing unit 205 outputs the image data after inversion to the enlargement processing unit 206.

The enlargement processing unit 206 enlarges the input image data. The enlargement processing unit 206 enlarges the image data according to a specified magnification. The enlargement processing unit 206 outputs the image data after enlargement to the main inversion processing unit 207 or the output interface 209.

The main inversion processing unit 207 inverts the input enlarged image data in the same manner as the main inversion processing unit 205. By performing inversion in the main scanning direction twice, the direction of the image data in the main scanning direction is returned to the direction before the inversion. The main inversion processing unit 207 outputs the image data after inversion to the sub inversion processing unit 210 or the output interface 209.

The memory 208 is a storage region in which the main inversion processing unit 205, the enlargement processing unit 206, and the main inversion processing unit 207 are used. The memory 208 is, for example, a line buffer. The memory 208 stores pixel data of some lines of the image data.

The sub inversion processing unit 210 inverts the input enlarged image data in the similar manner as the sub inversion processing unit 203. By performing inversion in the sub-canning direction twice, the direction of the image data in the sub scanning direction is returned to the direction before the inversion. The sub inversion processing unit 210 outputs the image data after inversion to the output interface 209.

The output interface 209 outputs the input image data to the printer interface 105, the RAM 114, or the HDD 115.

Generally, when the image data is enlarged or reduced, the start point of scanning serves as a reference point of scaling. Here, according to FIG. 4, the start point of scanning will be described. According to FIGS. 5 to 8, general enlargement using the start point of scanning as a reference point will be described.

Figure 4:
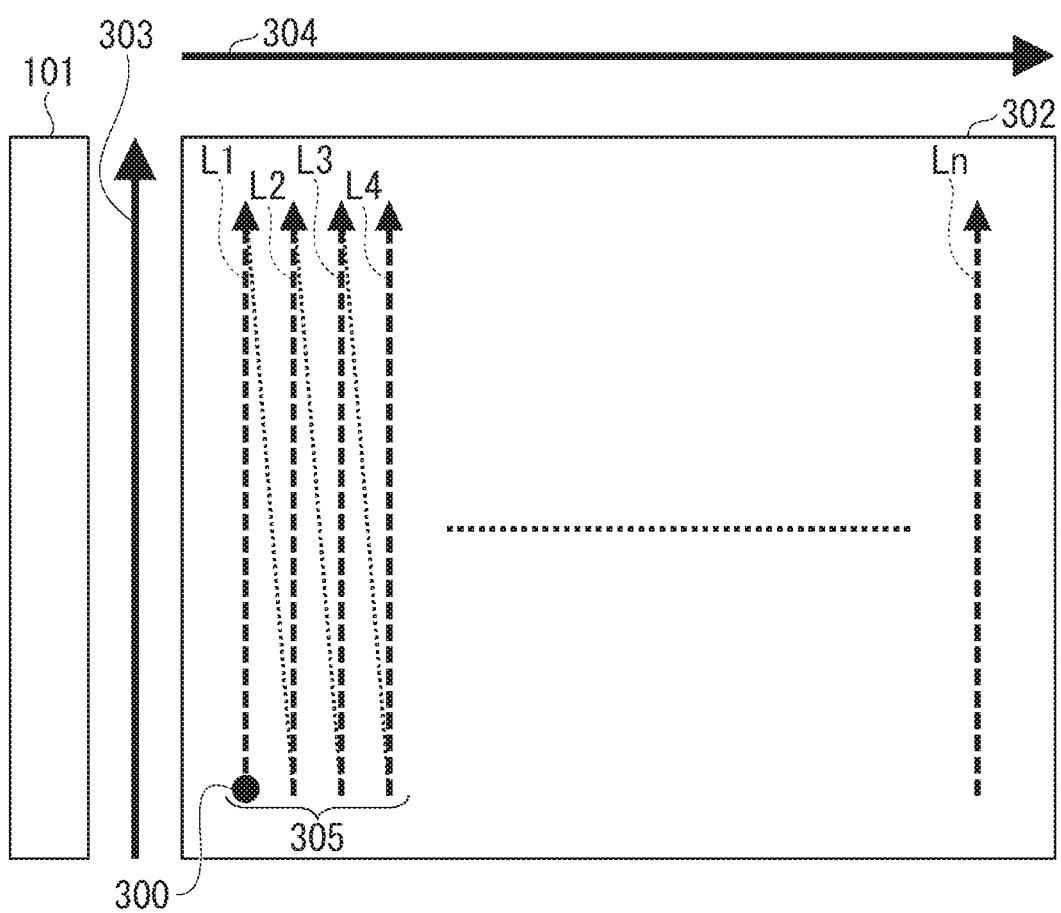
FIG. 4 is a diagram explaining a start point of scanning.

FIG. 4 is a diagram explaining the start point of scanning. FIG. 4 shows the scanner unit 101 (FIG. 2) and an original document 302. In the example of FIG. 4, an arrow 303 indicates the main scanning direction and an arrow 304 indicates a sub scanning direction.

The scanner unit 101 scans the original document 302 in a main scanning direction 303. The scanner unit 101 repeats scanning in the main scanning direction 303 along a sub scanning direction 304. Specifically, the scanner unit 101 performs scanning in the order of line L1, line L2, and line L3.

In this manner, the scanner unit 101 scans the original document 302 in the order of arrows 305 indicated by the dotted lines to generate image data. Therefore, in the example of FIG. 4, a first pixel of the image data is a pixel located at the lower left of the original document 302. The starting point 300 of the scanning in the example of FIG. 4 is the lower left position in the original document 302.

Figure 5:
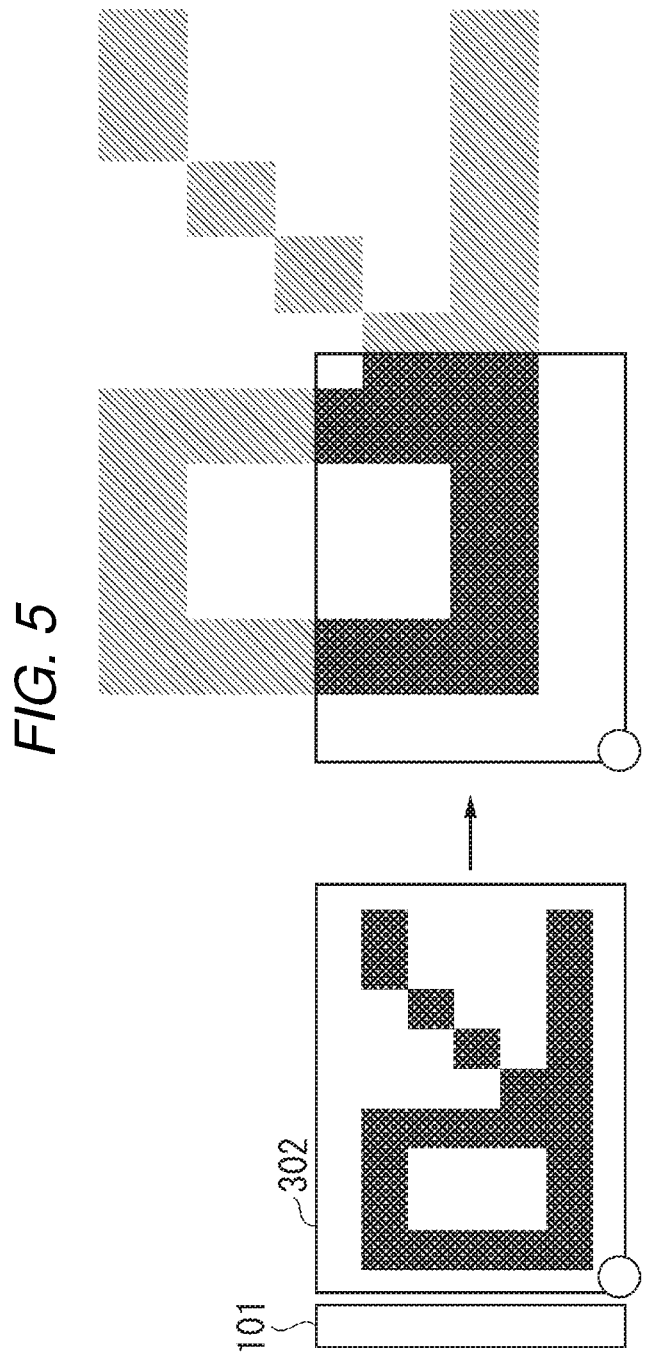
FIG. 5 is a first diagram illustrating an example of enlargement based on the start point of scanning.

FIG. 5 is a first diagram illustrating an example of enlargement based on the start point of scanning. In FIGS. 5 to 8, a case where the size of the image data after enlargement exceeds the size of the sheet is exemplified. An image indicated by hatched lines in FIGS. 5 to 8 represents an image that does not fit on the sheet.

In FIG. 5, the direction of the original document 302 is set such that the upper left portion of the character "R" overlaps the start point of scanning. As a result, the enlarged image of the upper left portion of the character "R" is printed on the sheet. On the other hand, an image excluding the upper left portion of the character "R" indicated by hatched lines is not printed on the sheet.

In the image processing apparatus 100, the start point of scanning is fixed. Accordingly, when the image indicated by the hatched lines is printed on the sheet, the user changes the direction of the original document 302 to be set on the scanner unit 101.

Figure 6:
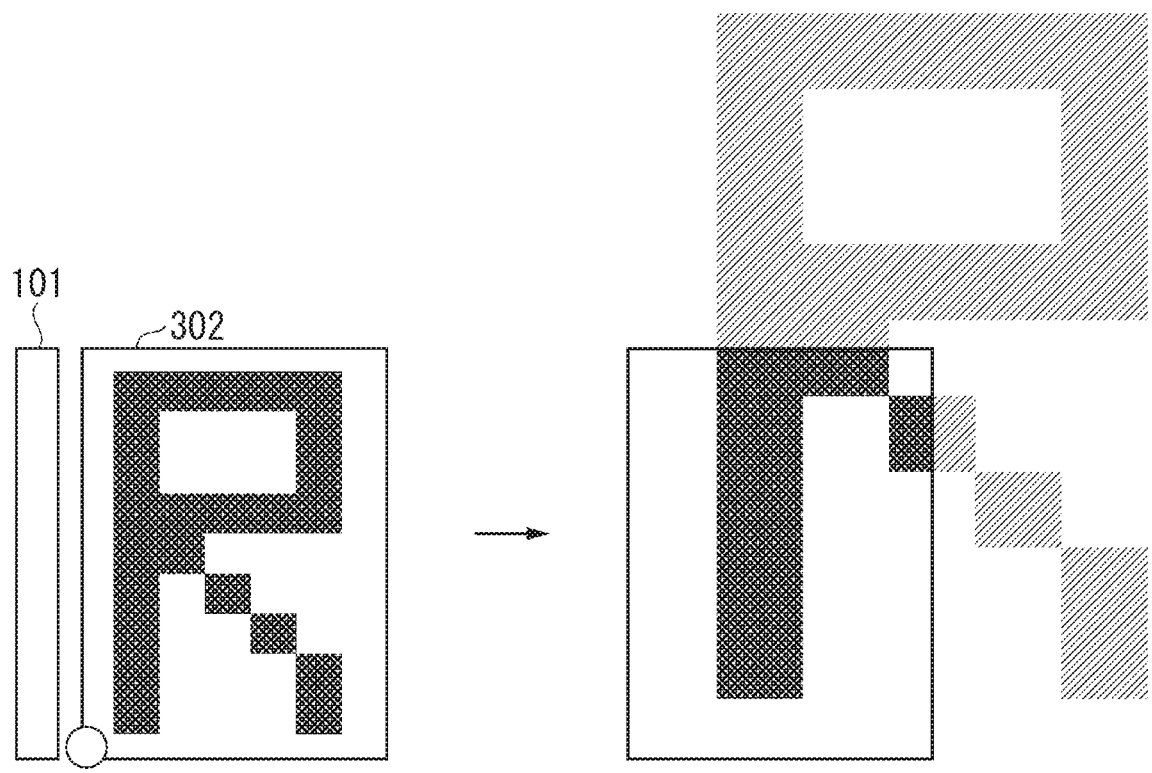
FIG. 6 is a second diagram illustrating an example of enlargement based on the start point of scanning.

FIG. 6 is a second diagram illustrating an example of enlargement based on the start point of scanning. In FIG. 6, compared to FIG. 5, the direction of the original document 302 is rotated clockwise by 90 degrees. Specifically, in FIG. 6, the direction of the document 302 is set such that the lower left portion of the character "R" overlaps the start point of scanning. Accordingly, the enlarged image of the lower left portion of the character "R" is printed on the sheet.

Figure 7:
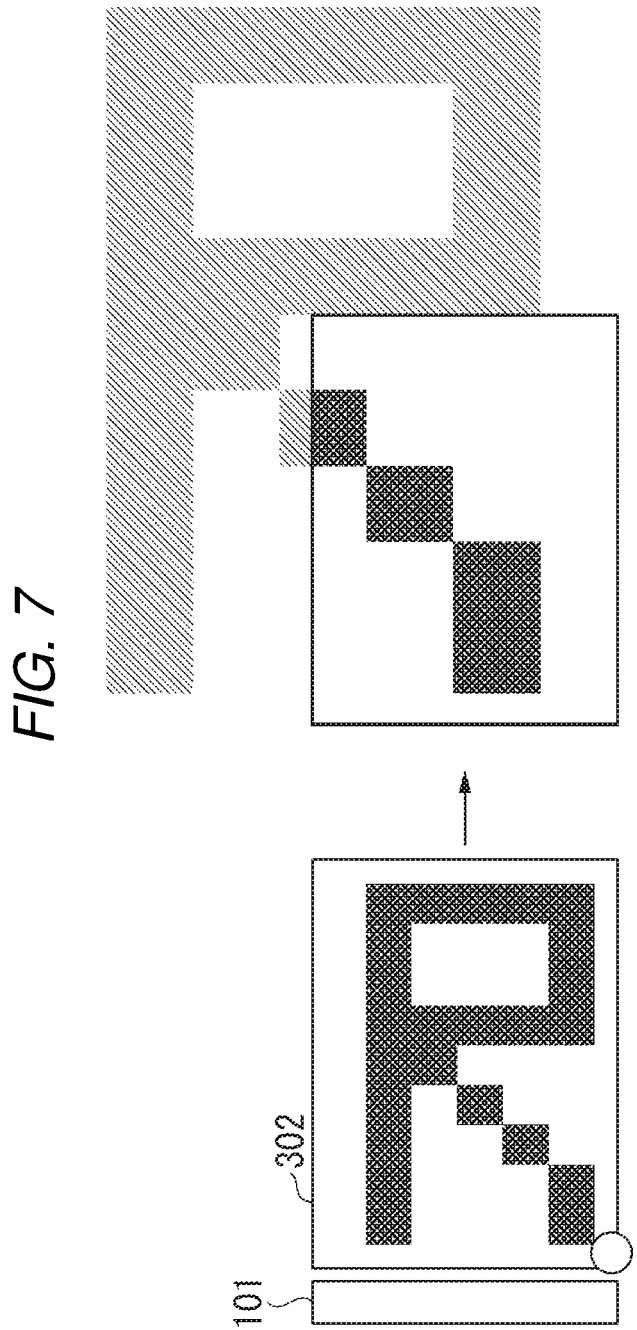
FIG. 7 is a third diagram illustrating an example of enlargement based on the start point of scanning.
Figure 8:
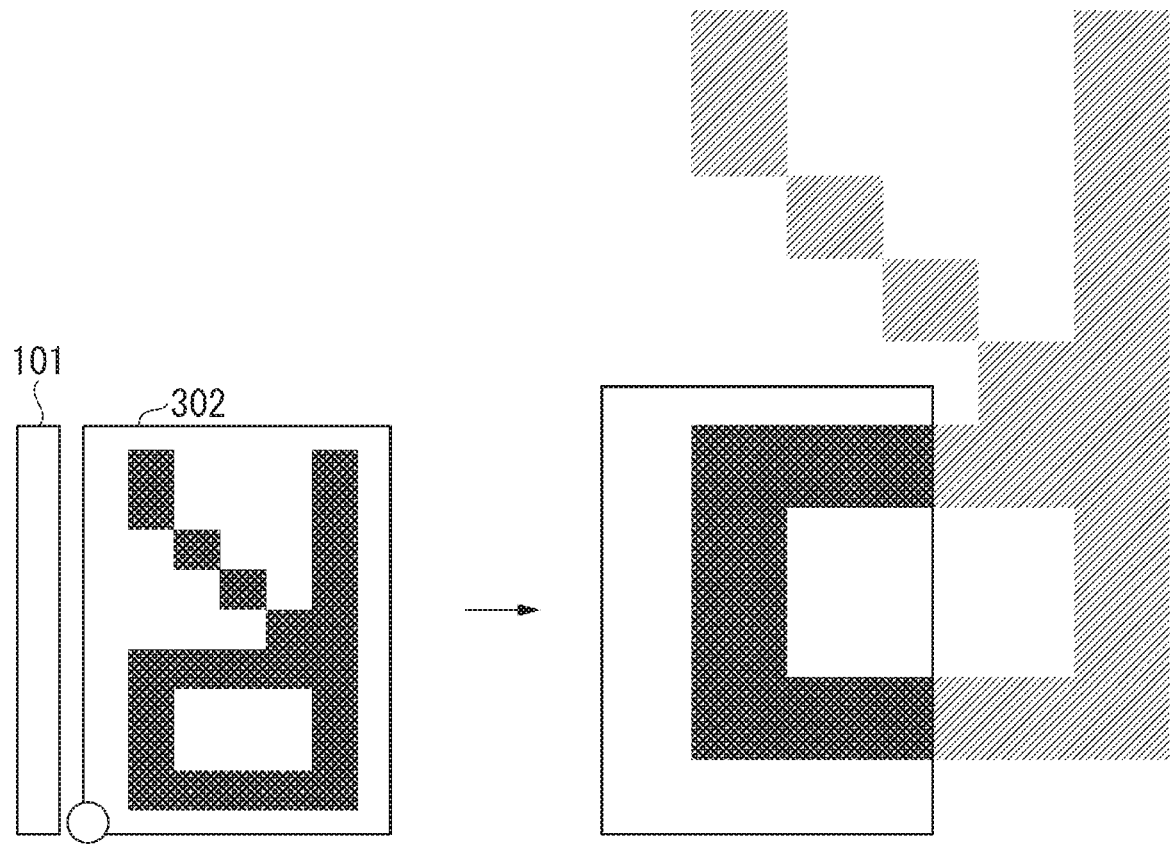
FIG. 8 is a fourth diagram illustrating an example of enlargement based on the start point of scanning.

FIG. 7 is a third diagram illustrating an example of enlargement based on the start point of scanning. In FIG. 7, compared to FIG. 5, the direction of the original document 302 is rotated clockwise by 180 degrees. Accordingly, an enlarged image of the lower right portion of the character "R" is printed on the sheet. FIG. 8 is a fourth diagram illustrating an example of enlargement based on the start point of scanning. In FIG. 8, compared to FIG. 5, the direction of the original document 302 is rotated clockwise by 270 degrees. Accordingly, an enlarged image of the upper right portion of the character "R" is printed on the sheet.

As described above, the starting point of scanning is the reference point of scaling. Therefore, as described in FIGS. 5 to 8, the user sets the direction of the original document 302 in consideration of the start point of scanning. However, the user does not necessarily recognize the start point of scanning. Therefore, the operation of changing the direction of the original document 302 in consideration of the start point of scanning is a complicated operation for the user.

Therefore, the image processing apparatus 100 in the embodiment accepts the reference point of scaling for enlarging or reducing image data. The image processing apparatus 100 inverts the image data in either or both of the main scanning direction and the sub scanning direction according to the reference point. The image processing apparatus 100 performs scaling on the inverted image data after inversion to generate scaled image data. The image processing apparatus 100 inverts the scaled image data again to generate non-inverted scaled image data.

Accordingly, the user can print a desired enlarged image based on the specified reference point. Therefore, the user does not need to set the direction of the original document in consideration of the start point of scanning. Thus, the user can print a desired enlarged image in accordance with a simple operation without being conscious of the direction of the original document.

In the embodiment, a case of enlarging image data will be exemplified. However, the embodiment is not limited to this example. This embodiment can also be applied to a case of reducing image data. Even in a case of application to reduction, the same effect as when applied to enlargement is exerted.

Figure 9:
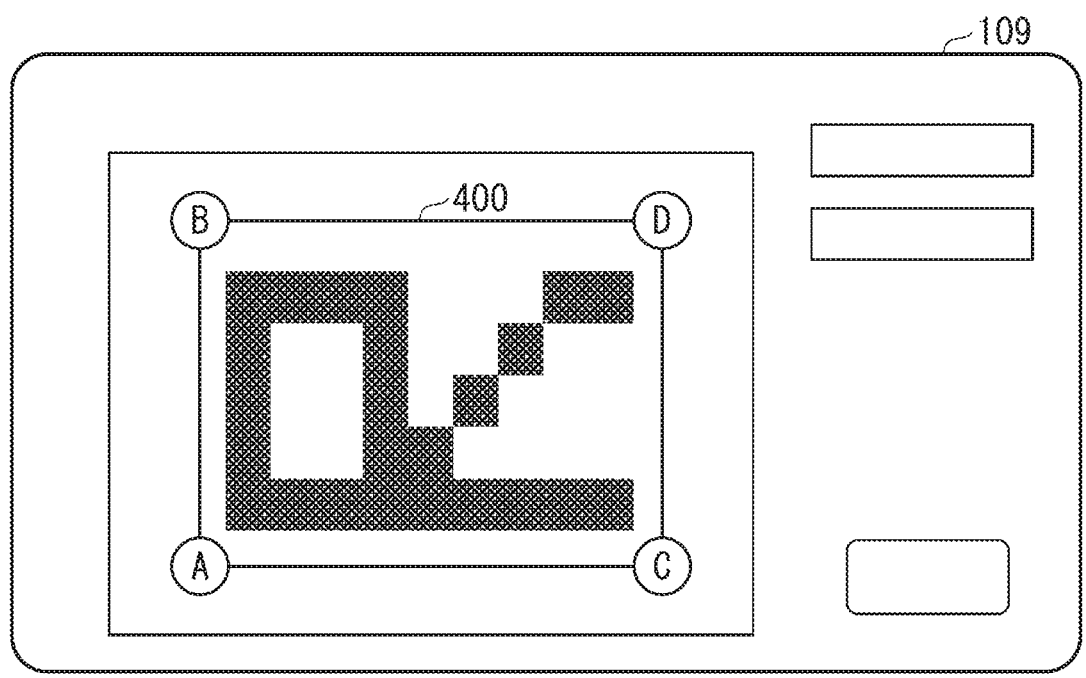
FIG. 9 is a diagram illustrating an example of a screen for accepting input of a reference point.

FIG. 9 is a diagram illustrating an example of a screen for accepting input of a reference point. The control panel control unit 108 causes the screen illustrated in FIG. 9 to be displayed on the control panel 109.

The control panel 109 displays a preview image 400 based on the image data generated by the scanning and candidates of the reference point. The reference point is one of four corners of the image defined by image data. Therefore, the reference candidate is the four corners ("A", "B", "C", and "D") of the preview image 400. The user selects a desired reference point from the reference point candidates "A" to "D" displayed on the control panel 109.

Although not illustrated, the control panel 109 may further accept specification of the magnification of the image data. Information on the reference point and magnification is input to the ASIC 104 by the control panel control unit 108.

Figure 10:
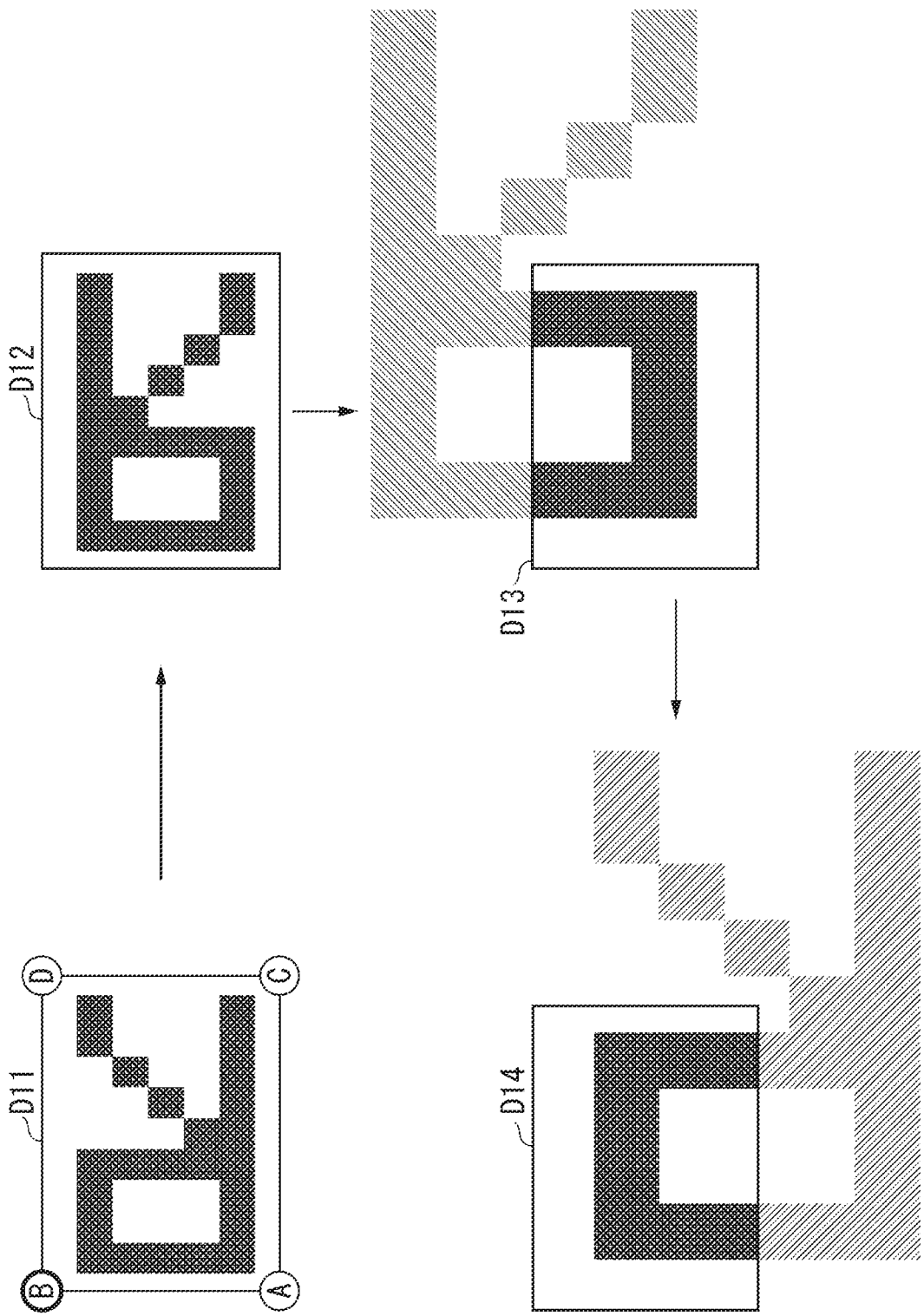
FIG. 10 is a diagram schematically explaining enlargement when a corner "B" is specified as a reference point.

FIG. 10 is a diagram schematically explaining enlargement when a corner "B" is specified as a reference point. When the corner "B" is specified as a reference point, the ASIC 104 inverts image data D11 in the main scanning direction. By the inversion, the position of each pixel data of the image data D11 is inverted in the main scanning direction. According to the example of FIG. 10, each pixel data of the image data D11 is inverted in the vertical direction.

As a result, image data D12 is generated in which the position of the corner "B" and the position of the corner "A" are inverted compared to the image data D11. Thus, the position of the corner "B" in the image data D12 is matched with the start point of scanning.

The ASIC 104 enlarges the image data D12 after inversion. That is, the ASIC 104 enlarges the image data D12 in which the selected reference point (corner "B") is matched with the start point of scanning. The ASIC 104 performs enlargement with the starting point of scanning as a reference point.

The ASIC 104 inverts image data D13 after enlargement in the main scanning direction again. By performing the inversion in the main scanning direction twice, image data D14 in which the position of each pixel data in the main scanning direction is returned to the original position is generated.

In this manner, when the reference point is located diagonally with respect to the start point of scanning in the main scanning direction, the ASIC 104 inverts the image data D11 in the main scanning direction. The ASIC 104 enlarges the image data D12 after inversion. In addition, the ASIC 104 inverts the image data D13 after enlargement in the main scanning direction again. As a result, it is possible to generate image data D14 which is enlarged with the corner "B" as the reference point.

Figure 11:
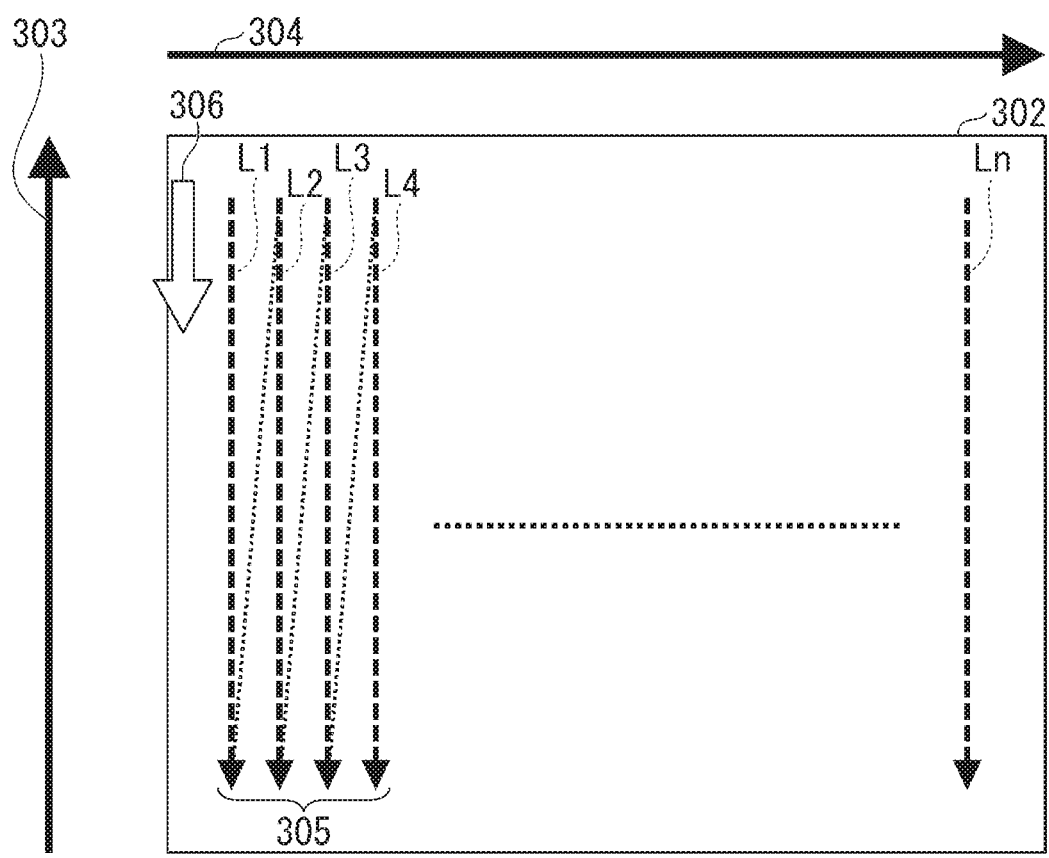
FIG. 11 is a diagram schematically explaining details of inversion in a main scanning direction.

FIG. 11 is a diagram schematically explaining details of inversion in a main scanning direction. Each of lines L1 to Ln illustrated in FIG. 11 has a plurality of pieces of pixel data (hereinafter, also referred to as a pixel data group) arranged in the main scanning direction 303. The inversion indicates a process of inverting the position of the pixel data group within the same line for each line in the main scanning direction with reference to the center in the main scanning direction as a reference.

Specifically, the main inversion processing unit 205 stores the pixel data group of each line in the memory 208. When the pixel data group is read from the memory 208, the main inversion processing unit 205 reads the pixel data group from a reverse direction 306 of the main scanning direction 303. The process of the main inversion processing unit 207 is similarly performed.

As described above, in the inversion to the main scanning direction, the pixel data group is read in order from a direction opposite to the main scanning direction for each line of image data. Accordingly, inverted image data inverted in the main scanning direction is generated. As a result, the reference point (corner "B") can be matched with the start point of scanning.

On the other hand, there is a method of matching the reference point (corner "B") with the starting point of scanning by generating the inverted image data rotated clockwise by 270 degrees. In this method, by reading the pixel data group of each line partially and transferring the read pixel data group to the memory repeatedly, conversion image data is generated. However, according to the method, the pixel data group of each line is partially read and is transferred to the memory. Therefore, the data transfer efficiency is low, and the number of accesses to the memory also increases. As a result, overhead is increased and the processing time is prolonged.

On the other hand, in the embodiment, by reading the pixel data group successively, the reference point is matched with the start point of scanning. Accordingly, the data transfer efficiency is high, and an increase in the number of accesses to the memory is also suppressed. As described above, in the embodiment, by using inversion, efficient access processing can be realized and the time required for processing can be shortened.

Figure 12:
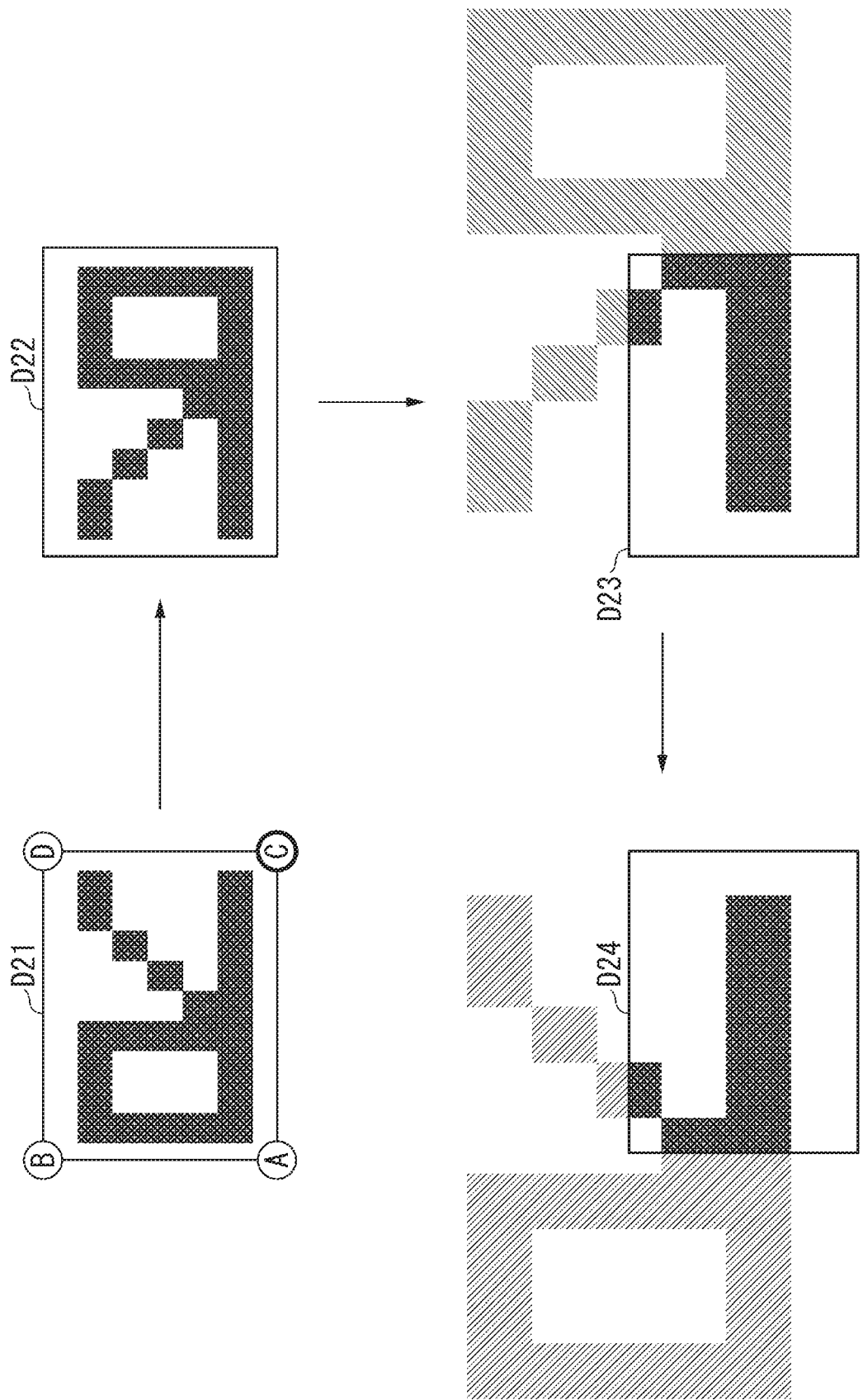
FIG. 12 is a diagram schematically explaining enlargement when a corner "C" is specified as a reference point.

FIG. 12 is a diagram schematically explaining enlargement when a corner "C" is specified as a reference point. When the corner "C" is specified as a reference point, the ASIC 104 inverts the image data D21 in the sub scanning direction. By the inversion, the position of each pixel data of the image data D21 is inverted in the sub scanning direction. According to the example of FIG. 12, each pixel data of the image data D21 is inverted in the horizontal direction.

As a result, image data D22 is generated in which the position of the corner "C" and the position of the corner "A" are inverted compared to the image data D21. Thus, the position of the corner "C" in the image data D22 is matched with the start point of scanning.

The ASIC 104 enlarges the image data D22 after inversion. That is, the ASIC 104 enlarges the image data D22 in which the selected reference point (corner "C") is matched with the start point of scanning.

The ASIC 104 inverts image data D23 after enlargement in the sub scanning direction again. By performing the inversion in the sub scanning direction twice, image data D24 in which the position of each pixel data in the sub scanning direction is returned to the original position is generated.

In this manner, when the reference point is located diagonally with respect to the start point of scanning in the sub scanning direction, the ASIC 104 inverts the image data D21 in the sub scanning direction. The ASIC 104 enlarges the image data D22 after inversion. In addition, the ASIC 104 inverts the image data D23 after enlargement in the sub scanning direction again. As a result, it is possible to generate image data D24 which is enlarged with the corner "C" as the reference point.

Figure 13:
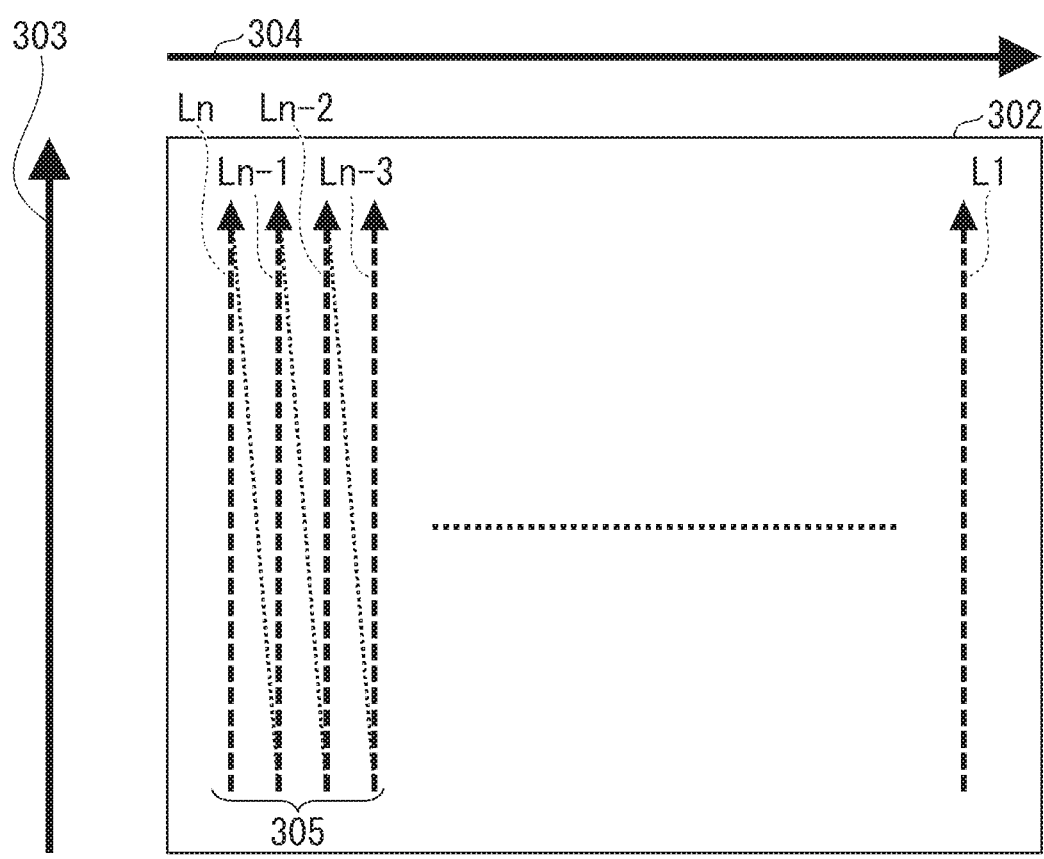
FIG. 13 is a diagram schematically explaining details of inversion in a sub scanning direction.

FIG. 13 is a diagram schematically explaining details of inversion in a sub scanning direction. The inversion indicates a process of inverting the position of the pixel data group in the sub scanning direction between each of a plurality of lines of image data with reference to the center in the sub scanning direction as a reference.

Specifically, the sub inversion processing unit 203 reads pixel data of a line in order from a line whose order of scanning is late, and outputs the pixel data as a line whose order of scanning is early. That is, the sub inversion processing unit 203 reads pixel data group of line Ln and outputs the read data as a pixel data group of line L1. In the same manner, the sub inversion processing unit 203 reads pixel data group of line Ln−1 and outputs the read data as a pixel data group of line L2. Regarding other lines, the same is applied. The process of the sub inversion processing unit 210 is the same.

In this manner, in the inversion to the sub scanning direction, regarding the plurality of lines of the image data, the pixel data group is read in order from a line whose order of scanning is late. The read pixel data group is stored as pixel data group of a line whose order of scanning is early. Thus, inverted image data inverted in the sub scanning direction is generated. As a result, it is possible to match the reference point (corner "C") with the start point of scanning.

On the other hand, there is a method of matching the reference point (corner "C") with the start point of scanning by generating conversion image data rotated clockwise by 90 degrees. In this method, a process of partially reading the pixel data group of each line and writing the read pixel data group in a memory is repeated to generate conversion image data. However, according to this method, the pixel data group of each line is partially read and transferred to the memory. Therefore, the data transfer efficiency is low, and the number of accesses to the memory also increases. As a result, overhead is increased and the processing time is prolonged.

In contrast, in the embodiment, by reading the continuous pixel data groups and transferring the read pixel data group to the memory, the reference point is matched with the start point of scanning. For this reason, the data transfer efficiency is high, and an increase in the number of accesses to the memory is also suppressed. As described above, in the embodiment, by using inversion, the efficient access processing can be realized and the time required for processing can be shortened.

Figure 14:
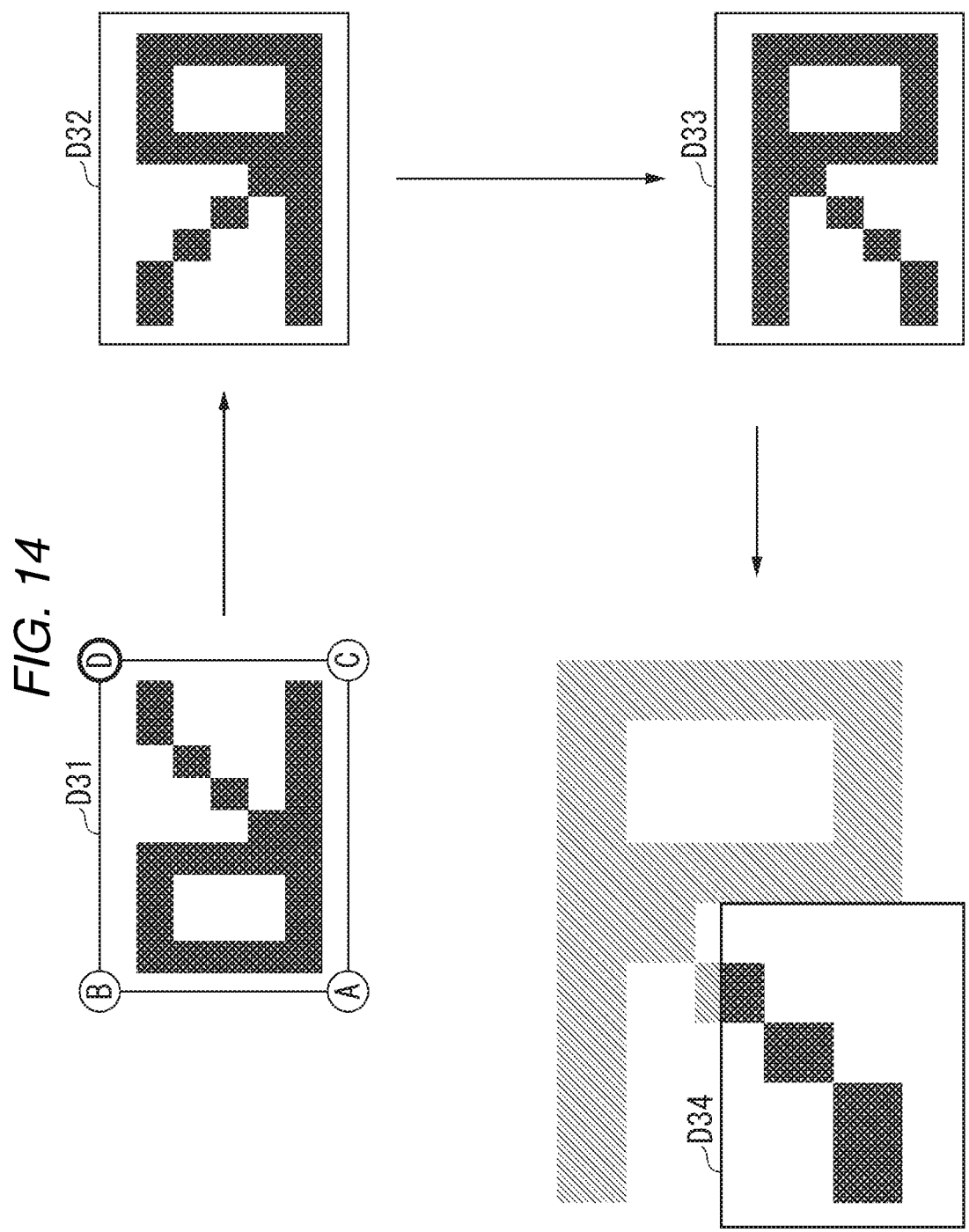
FIG. 14 is a first diagram schematically explaining enlargement when a corner "D" is specified as a reference point.

FIG. 14 is a first diagram schematically explaining enlargement when a corner "D" is specified as a reference point. When the corner "D" is specified as a reference point, the ASIC 104 inverts image data D31 in the sub scanning direction. The ASIC 104 further inverts image data D32 after inversion in the main scanning direction. As a result, image data D33 in which the position of the corner "D" and the position of the corner "A" are inverted is generated compared to the image data D31.

The ASIC 104 enlarges the image data D33 after the inversion in the main scanning direction and in the sub scanning direction. That is, the ASIC 104 enlarges the image data D33 in which the selected reference point (corner "D") is matched with the start point of scanning.

Figure 15:
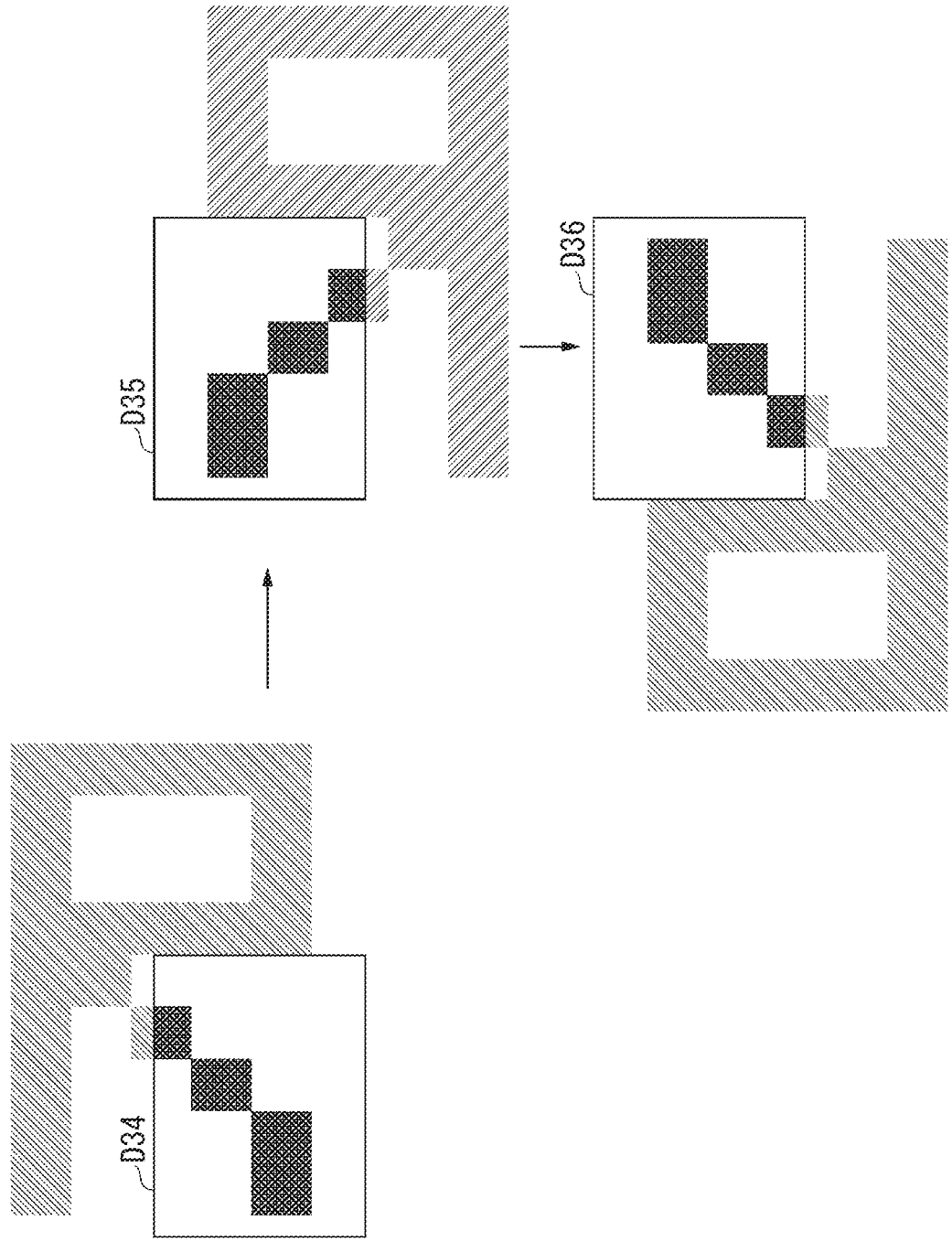
FIG. 15 is a second diagram schematically explaining enlargement when a corner "D" is specified as a reference point.

FIG. 15 is a second diagram schematically explaining enlargement when a corner "D" is specified as a reference point. Image data D34 in FIG. 15 is the same as image data D34 in FIG. 14.

The ASIC 104 inverts the image data D34 after enlargement in the main scanning direction again. Accordingly, image data D35 in which the position of each pixel data in the main scanning direction is returned to the position before the inversion in the main scanning direction is generated. The ASIC 104 inverts the image data D35 after inversion in the sub scanning direction again. Thus, image data D36 in which the position of each pixel data in the sub scanning direction is returned to the position before the inversion in the sub scanning direction is generated.

As described above, when the reference point is located diagonally with respect to the start point of scanning in the main scanning direction and in the sub scanning direction, the ASIC 104 performs the following process. That is, the ASIC 104 inverts the image data D31 in the main scanning direction and in the sub scanning direction. The ASIC 104 enlarges the image data D32 after inversion. In addition, the ASIC 104 inverts the image data D33 after enlargement in the main scanning direction and in the sub scanning direction again. Thus, image data D14 which is subjected to enlargement as a reference point of the corner "D" can be generated.

As described above, the data transfer efficiency in the inversion in the main scanning direction and in the sub scanning direction high and an increase in the number of accesses to the memory is suppressed. Accordingly, it is possible to efficiently generate image data in which the reference point (corner "D") is matched with the start point of the scanning.

Figure 16:
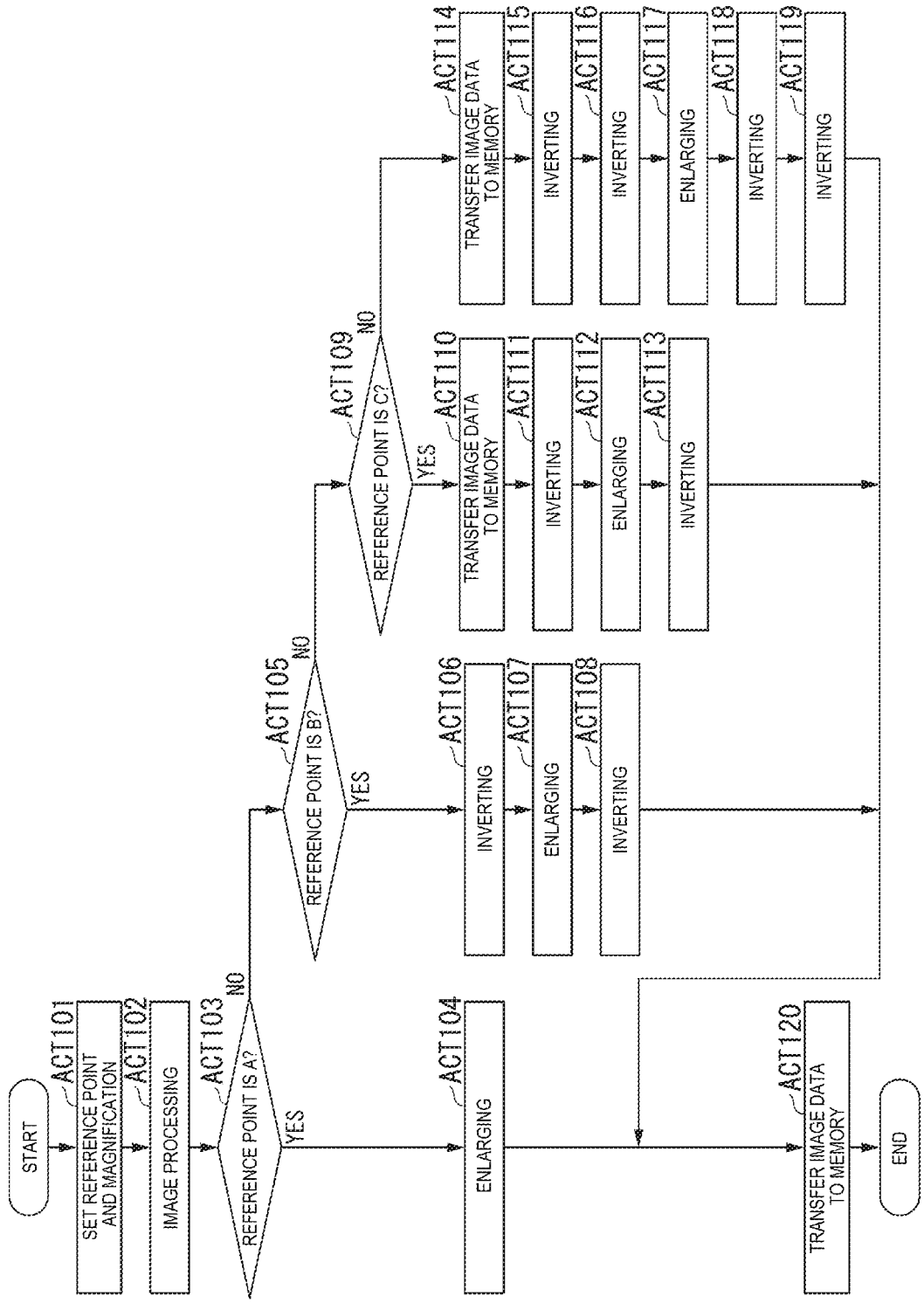
FIG. 16 is a flow chart explaining a flow of enlargement in the embodiment.

FIG. 16 is a flow chart explaining a flow of enlargement in the embodiment.

A user operates the control panel 109 to set a reference point and magnification of enlargement (ACT 101). The CPU 110 inputs image data to the image processing unit 202 via the input interface 201. The image processing unit 202 performs predetermined image processing on the input image data (ACT 102).

The ASIC 104 determines whether or not the specified reference point is a corner "A" (ACT 103). When the reference point is the corner "A" (YES in ACT 103), the image processing unit 202 outputs the image data after the image processing to the enlargement processing unit 206 via the SEL 204.

The enlargement processing unit 206 enlarges image data in accordance with the specified magnification (ACT 104). The enlargement processing unit 206 performs enlargement based on the start point of scanning. The enlargement processing unit 206 outputs the image data after enlargement to the output interface 209.

On the other hand, if the specified reference point is not the corner "A" (NO in ACT 103), the ASIC 104 determines whether or not the reference point is the corner "B" (ACT 105). If the reference point is the corner "B" (YES in ACT 105), the image processing unit 202 outputs the image data after image processing to the main inversion processing unit 205 via the SEL 204. The main inversion processing unit 205 inverts image data in the main scanning direction (ACT 106).

Specifically, the main inversion processing unit 205 sequentially outputs the pixel data group of each line read from the opposite direction of the main scanning direction to the enlargement processing unit 206. The enlargement processing unit 206 enlarges the image data based on the input pixel data group according to the specified magnification (ACT 107). The enlargement processing unit 206 outputs the image data after enlargement to the main inversion processing unit 207.

The main inversion processing unit 207 inverts the image data after enlargement in the main scanning direction again (ACT 108). The main inversion processing unit 207 outputs the image data after inversion to the output interface 209.

On the other hand, if the specified reference point is not the corner "B" (NO in ACT 105), the ASIC 104 determines whether or not the reference point is a corner "C" (ACT 109). If the reference point is the corner "C" (YES in ACT 109), the image processing unit 202 outputs the image data after image processing to the output interface 209. The output interface 209 transfers the input image data to the RAM 103 (memory) (ACT 110).

The sub inversion processing unit 203 performs inversion in the sub scanning direction based on the image data transferred to the RAM 103 (ACT 111). Specifically, the sub inversion processing unit 203 sequentially reads the pixel data group for the image data transferred to the RAM 103 from the line after scanning.

The SEL 204 outputs the image data after inversion to the enlargement processing unit 206. The enlargement processing unit 206 enlarges image data according to the specified magnification (ACT 112). The enlargement processing unit 206 outputs the image data after enlargement to the sub inversion processing unit 210.

The sub inversion processing unit 210 inverts the image data after enlargement in the sub scanning direction again (ACT 113). Specifically, the sub inversion processing unit 210 sequentially reads from the last line Ln of the image data after enlargement and outputs the read image data to the output interface 209. Thus, the direction of the image data output to the output interface 209 in the sub scanning direction is returned to the direction before the inversion is performed.

On the other hand, if the specified reference point is not the corner "C" (NO in ACT 109), the reference point is the corner "D". In this case, the ASIC 104 performs the same processes as the processes ACTs 110 and 111 (ACT 114 and ACT 115). The SEL 204 outputs the image data after inversion in the sub scanning direction to the main inversion processing unit 205. In the same manner as the process ACT 106, the main inversion processing unit 205 inverts the image data in the main scanning direction (ACT 116). The main inversion processing unit 205 outputs the image data after inversion to the enlargement processing unit 206.

The enlargement processing unit 206 enlarges the image data according to the specified magnification (ACT 117). The enlargement processing unit 206 outputs the image data after enlargement to the main inversion processing unit 207.

In the same manner as the process ACT 108, the main inversion processing unit 207 inverts the image data after enlargement in the main scanning direction again (ACT 118). Further, in the same manner as the process ACT 113, the sub inversion processing unit 210 inverts the image data after inversion in the sub scanning direction again (ACT 119). The sub inversion processing unit 210 outputs the image data after inversion to the output interface 209.

The output interface 209 transfers the input image data to the printer interface 105, the RAM 114, or the HDD 115 (ACT 120). Accordingly, the image data subjected to the enlargement according to the reference point specified by the user is printed or stored.

In the above-described embodiment, the flow of the processes ACT 114 to ACT 116 is exemplified when the reference point is the corner "D". That is, a case where the inversion in the main scanning direction is performed after the inversion in the sub scanning direction is exemplified. However, the embodiment is not limited to this example. After inversion in the main scanning direction is performed, inversion in the sub scanning direction may be performed. The same is applied to the processes ACT 118 and ACT 119.

As described above, the image processing apparatus 100 according to the embodiment has an input unit (control panel 109) and a control unit (ASIC 104). The input unit accepts the reference point of scaling for enlarging or reducing image data. The control unit inverts the image data in either or both of the main scanning direction and the sub scanning direction according to the reference point to generate inverted image data. The control unit performs scaling on the generated inverted image data to generate scaled image data. The control unit performs inversion on the scaled image data again to generate non-inverted scaled image data.

Thus, the user can print a desired scaled image based on the specified reference point. The user does not need to set the direction of the original document in consideration of the start point of scanning. Therefore, the user can print a desired scaled image according to a simple operation without being conscious of the direction of the original document.

In addition, the control unit in the embodiment realizes inversion of image data based on a process of reading a continuous pixel data groups. The transfer efficiency of the reading of the continuous pixel data groups is high, and an increase in the number of accesses can also be suppressed. On the other hand, when the reference point is changed by rotating the image data by 90 degrees or 270 degrees, the pixel data is partially read out. Therefore, the transfer efficiency is low and the number of accesses also increases. Therefore, as in the embodiment, by changing the reference point according to inversion, it is possible to greatly shorten the time required for the processing.

In the above embodiment, a case where the processing of the control unit is realized by hardware is exemplified, but the embodiment is not limited to this example. The processing of the control unit may be realized by software. By executing a program stored in the ROM 111, the CPU 110 realizes the processing of the ASIC 104.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image processing apparatus, comprising:
an input unit configured to accept a reference point of scaling for enlarging or reducing image data; and
a control unit configured to perform scaling on inverted image data that is generated by performing a first inversion for inverting the image data in either or both of a main scanning direction and a sub scanning direction according to the reference point to generate scaled image data and performing a second inversion on the scaled image data to generate non-inverted scaled image data, wherein the control unit first inverts the image data in the main scanning direction when the reference point is located diagonally with respect to a start point of scanning in the main scanning direction.

2. The apparatus according to claim 1,
wherein the reference point is one of four corners of an image defined by the image data.

3. The apparatus according to claim 1,
wherein the control unit reads a plurality of pieces of pixel data in order from an opposite direction to the main scanning direction with respect to each line including the plurality of pieces of pixel data arranged along the main scanning direction to generate the scaled image data inverted in the main scanning direction.

4. The apparatus according to claim 1,
wherein the first inversion of image data in the main scanning direction is a process of inverting, with respect to each line including a plurality of pieces of pixel data arranged along the main scanning direction, a position of the plurality of pieces of pixel data in the main scanning direction with reference to the center in the main scanning direction as a reference within the same line.

5. An image processing method comprising:
accepting a reference point of scaling for enlarging or reducing image data; and
performing the scaling on inverted image data that is generated by performing a first inversion for inverting the image data in either or both of a main scanning direction and a sub scanning direction according to the reference point to generate scaled image data and performing a second inversion on the scaled image data to generate non-inverted scaled image data, wherein the first inversion of the image data in the main scanning direction is performed when the reference point is located diagonally with respect to a start point of scanning in the main scanning direction.

6. The image processing method according to claim 5,
wherein the reference point is one of four corners of an image defined by the image data.

7. The image processing method according to claim 5, further comprising:
reading a plurality of pieces of pixel data in order from an opposite direction to the main scanning direction with respect to each line including the plurality of pieces of pixel data arranged along the main scanning direction to generate the scaled image data inverted in the main scanning direction.

8. The image processing method according to claim 5,
wherein the first inversion of image data in the main scanning direction comprises inverting, with respect to each line including a plurality of pieces of pixel data arranged along the main scanning direction, a position of the plurality of pieces of pixel data in the main scanning direction with reference to the center in the main scanning direction as a reference within the same line.

9. An image processing apparatus, comprising:
an input unit configured to accept a reference point of scaling for enlarging or reducing image data; and
a control unit configured to perform scaling on inverted image data that is generated by performing a first inversion for inverting the image data in either or both of a main scanning direction and a sub scanning direction according to the reference point to generate scaled image data and performing a second inversion on the scaled image data to generate non-inverted scaled image data, wherein the control unit first inverts the image data in the sub scanning direction when the reference point is located diagonally with respect to a start point of scanning in the sub scanning direction.

10. The image processing apparatus according to claim 9,
wherein the reference point is one of four corners of an image defined by the image data.

11. The image processing apparatus according to claim 9,
wherein the control unit reads a plurality of pieces of pixel data from a line whose order of scanning is late in order, with respect to a plurality of lines each including the plurality of pieces of pixel data arranged along the main scanning direction, and stores the read data as the plurality of pieces of pixel data of a line whose order of scanning is early to generate the scaled image data inverted in the sub scanning direction.

12. The image processing apparatus according to claim 9, wherein the first inversion of image data in the sub scanning direction is a process of inverting, with respect to a plurality of lines each including a plurality of pieces of pixel data arranged along the main scanning direction, a position of the plurality of pieces of pixel data of each line in the sub scanning direction with reference to the center in the sub scanning direction as a reference between the plurality of lines.

13. An image processing apparatus, comprising:
an input unit configured to accept a reference point of scaling for enlarging or reducing image data; and
a control unit configured to perform scaling on inverted image data that is generated by performing a first inversion for inverting the image data in either or both of a main scanning direction and a sub scanning direction according to the reference point to generate scaled image data and performing a second inversion on the scaled image data to generate non-inverted scaled image data, wherein the control unit first inverts the image data in the main scanning direction and in the sub scanning direction when the reference point is located diagonally with respect to a start point of scanning in the main scanning direction and in the sub scanning direction.

14. The image processing apparatus according to claim 13,
wherein the reference point is one of four corners of an image defined by the image data.

15. An image processing method comprising:
accepting a reference point of scaling for enlarging or reducing image data; and
performing the scaling on inverted image data that is generated by performing a first inversion for inverting the image data in either or both of a main scanning direction and a sub scanning direction according to the reference point to generate scaled image data and performing a second inversion on the scaled image data to generate non-inverted scaled image data, wherein the first inversion of the image data in the sub scanning direction is performed when the reference point is located diagonally with respect to a start point of scanning in the sub scanning direction.

16. The image processing method according to claim 15, wherein the reference point is one of four corners of an image defined by the image data.

17. The image processing method according to claim 15, further comprising:
reading a plurality of pieces of pixel data from a line whose order of scanning is late in order, with respect to a plurality of lines each including the plurality of pieces of pixel data arranged along the main scanning direction, and storing the read data as the plurality of pieces of pixel data of a line whose order of scanning is early to generate the scaled image data inverted in the sub scanning direction.

18. The image processing method according to claim 15, wherein the first inversion of image data in the sub scanning direction comprises inverting, with respect to a plurality of lines each including a plurality of pieces of pixel data arranged along the main scanning direction, a position of the plurality of pieces of pixel data of each line in the sub scanning direction with reference to the center in the sub scanning direction as a reference between the plurality of lines.

19. An image processing method comprising:
accepting a reference point of scaling for enlarging or reducing image data; and
performing the scaling on inverted image data that is generated by performing a first inversion for inverting the image data in either or both of a main scanning direction and a sub scanning direction according to the reference point to generate scaled image data and performing a second inversion on the scaled image data to generate non-inverted scaled image data, wherein the first inversion of the image data in the main scanning direction and in the sub scanning direction is performed when the reference point is located diagonally with respect to a start point of scanning in the main scanning direction and in the sub scanning direction.

20. The image processing method according to claim 19, wherein the reference point is one of four corners of an image defined by the image data.

* * * * *